(12) United States Patent
Fu et al.

(10) Patent No.: US 8,928,901 B2
(45) Date of Patent: Jan. 6, 2015

(54) GENERATING AN IMAGE PROFILE LUT FOR A N-COLOR MARKING DEVICE VIA MULTI-OBJECTIVE COST MINIMIZATION

(75) Inventors: Lina Fu, Webster, NY (US); Alvaro Enrique Gil, Rochester, NY (US); Lalit Keshav Mestha, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 255 days.

(21) Appl. No.: 13/351,630

(22) Filed: Jan. 17, 2012

(65) Prior Publication Data

US 2013/0182266 A1  Jul. 18, 2013

(51) Int. Cl.
  *H04N 1/60* (2006.01)
(52) U.S. Cl.
  USPC ............... 358/1.13; 358/1.14; 358/1.15
(58) Field of Classification Search
  None
  See application file for complete search history.

(56) References Cited

U.S. PATENT DOCUMENTS

| 2002/0165684 | A1* | 11/2002 | Olson ............................ 702/85 |
| 2005/0128495 | A1* | 6/2005 | Arai .............................. 358/1.9 |
| 2009/0296109 | A1 | 12/2009 | Maltz et al. |
| 2009/0296171 | A1 | 12/2009 | Mestha et al. |
| 2010/0189348 | A1* | 7/2010 | Dalal et al. .................... 382/167 |
| 2011/0305389 | A1* | 12/2011 | Maltz et al. .................. 382/167 |

OTHER PUBLICATIONS

Yoshi Ohno, "CIE Fundamentals for Color Measurements", Proceedings IS&T NIP 16 Int. Conf. on Digital Printing Technologies, pp. 540-545, (Oct. 2000).
Gaurav Sharma, et al., "The CIEDE2000 Color-Difference Formula", Color Research and Application, vol. 30, No. 1, (Feb. 2005).
Alvaro Enrique Gil, et al., Using a Pareto Frontier to Find an Optimal Color Solution for Spot Color Calibration, U.S. Appl. No. 13/253,660, filed Oct. 5, 2011.
U.S. Patent Specification for "Switching Controller System and Method for Improving Image Graininess During Color Management Profile Construction".

* cited by examiner

*Primary Examiner* — Marivelisse Santiago Cordero
*Assistant Examiner* — Darryl V Dottin
(74) *Attorney, Agent, or Firm* — Philip E. Blair; Fleit Gibbons Gutman Bongini & Bianco P.L.

(57) ABSTRACT

What is disclosed is a method for profile LUT construction which uses a cost function to provide improvements to one or more image quality attributes present in printed images while imposing constraints in terms of color accuracy and spectral response to achieve a color match under various illuminants. Image quality attributes are selected. A reference profile is selected. For each node, candidate recipes are found which reproduce L*a*b* colors within a threshold $e_m$. Recipes are pruned to a subset containing recipes where a spectral difference between a predicted spectra corresponding to N color levels and a reference reflectance spectra corresponding to a spectra of a recipe produced by the reference profile, is less than a threshold. A cost function is computed and a recipe identified which minimizes the cost for this node. The process repeats for all nodes to produce a new profile LUT.

8 Claims, 7 Drawing Sheets

GENERATING AN IMAGE PROFILE LUT FOR A N-COLOR MARKING DEVICE VIA MULTI-OBJECTIVE COST MINIMIZATION

TECHNICAL FIELD

The present invention is directed to systems and methods which formulate the image profiling task as a constrained multi-objective optimization problem to explicitly account for more than one image quality criteria to improve the performance of image reproduction in an N-color marking system.

BACKGROUND

In a N-color printer (N≥4), the image profiling process constructs a lookup table (LUT) from a device-independent colorimetric color space (for example, sRGB space) to the device color space (for example, CMYK) based on the characteristics of the target printer. Each node in the table corresponds to a 3-to-N mapping. Therefore, there is N-3 degree of freedom in determining the mapping for each input color, which can be exploited to optimize image quality related objectives. Traditionally, the smoothness of LUT in the device color space is the main constraint in deriving the profile. This is necessary to reduce the separation noise to avoid artifacts such as contours in the prints. Existing profiling algorithms manually adjust the gray color replacement (GCR) level along the neutral axis to achieve desired performance, which can be time consuming and may not yield optimal results when several cost functions are taken into consideration.

Accordingly, what is needed in this art are increasingly sophisticated methods for profile LUT construction which, while ensuring the smoothness of LUT in the device color space and robust color match, improve one or more image quality attributes of the resulting prints.

INCORPORATED REFERENCES

The following publications are incorporated herein in their entirety by reference.

"*CIE Fundamentals for Color Measurements*", Yoshi Ohno, Proceedings IS&T NIP16 Intl. Conf. on Digital Printing Technologies, pp. 540-545, (October 2000).

"*The CIEDE2000 Color-Difference Formula*", Gaurav Sharma, Wencheng Wu, and Edul. N. Dalal, Color Research and Application, Vol. 30. No. 1, (February 2005).

BRIEF SUMMARY

What is disclosed is a system and method for profile LUT construction which uses a multi-objective cost function to improve one or more image quality attributes while ensuring robust color match and smoothness of the LUT. In an example embodiment, where noise mottle frequency is selected as the image quality attribute to be improved, printer model based simulations have shown notable noise mottle reduction in many Look Up Table (LUT) nodes in the darker region of the printer gamut. Tests demonstrate visual improvement in images, especially in the background areas or areas with (near) constant colors. The present constrained multi-objective optimization framework accommodates image quality related objectives that Xerox customers are interested in and can also be applied to N-color print devices.

One embodiment of the present method for constructing a profile LUT for accurate color reproduction in a color marking device involves performing the following. First, at least one image quality attribute is selected which is desired to be improved for a color marking device. Image quality attributes can be, for example, graininess, NMF, temporal color variation, streaks, color stability, and/or ink cost. Each of the selected image quality attributes has an associated cost of applying that attribute to the device. A reference ICC profile is selected to determine reference reflectance spectral values for each node of a LUT of that device. Then, for each node of the LUT, starting from nodes along the neutral axis, the following are iteratively performed: Candidate recipes are found which can reproduce target L*a*b* colors associated with this node to within a color matching error which is less than a threshold error $e_m$. The candidate recipes are pruned to a subset containing only those recipes where a spectral difference between a predicted spectra corresponding to N color levels for a given recipe for this node and a reference reflectance spectra corresponding to the recipe produced by the reference profile for target L*a*b* colors associated with this node, is less than a threshold distance $d_m$. Each of the candidate recipes has a cost determined with respect to each of the selected image quality attributes. A multi-objective cost function J, which is based upon each cost associated with each recipe in the subset of recipes, is computed and driven to a minimum. Embodiments of the multi-objective cost function are disclosed. A candidate recipe is identified which minimizes the multi-objective cost function for this node. The process is repeated for all nodes of the LUT. Upon completion, a new profile LUT is generated for the color marking device using each of the identified candidate recipes. The new LUT produces colors on the color marking device which have a visual color match and which are robust to illumination variation, while improving the image quality attributes desired to be improved for this color marking device.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for profile LUT construction. A multi-objective cost function is used to improve one or more image quality attributes, while ensuring the smoothness of LUT in device color space and robust color match.

Those of ordinary skill in this art would be familiar with the text: "*Digital Color Imaging Handbook*", ISBN-13: 9780849309007, and "*Control of Color Imaging Systems: Analysis and Design*", ISBN-13: 9780849337468, "*Principles of Color Technology*", ISBN-13: 9780471194590, and "*Principles of Color Reproduction*", ISBN-13: 9780883622223, all of which are incorporated herein in their entirety by reference.

Non-Limiting Definitions

A "device-independent color space" is any standard color space that is commonly used to define or describe color, e.g. CIE XYZ, CIE L*a*b*, CIE L*u*v*, sRGB etc.

A "device-dependent color space" is a color space that is non-standard and cannot be used to commonly define colors without additional information such as the characteristics of the rendering device. For example, the commonly used CMYK color space for 4-color printers is a device-dependent color space since the rendering of a given CMYK color could yield very different (device-independent) colors from one model of a printer to another model of a printer. For non-linear transformations pertinent to device-independent color spaces, the interested reader is directed to Appendix A.6.1 of the above-referenced text: "*Control of Color Imaging Systems: Analysis and Design*".

A "printer model" converts values in a device-dependent color space to values in a device-independent color space for a target marking system. A printer model can have the form of a look-up table (LUT) such as a 4-D LUT for CMYK printer, or a parameterized fitted function such as a polynomial that relates inputs in device-dependent color space to outputs in device-independent color space. It can also be a forward mapping function of the printer from input N-color recipe to reflectance spectra, L*a*b*, and image quality.

A "color marking device" is a multi-function device known in the arts capable of rendering an image using N-color print processes. A widely used 4-color print process is composed of: Cyan (C), Magenta (M), Yellow (Y), and Black (Key), commonly referred to as CMYK. Advanced hexachromatic processes have additional colors added to compensate for the inefficient reproduction of faint tints using only four colors. For example, a six color CMYKOG process adds Orange (O) and Green (G). A six color CMYKOV adds Orange (O) and Violet (V). It should be appreciated that the teachings hereof are intended to be applied to N-color devices (N≥4). Such embodiments are intended to be encompassed by the scope of the appended claims.

A "color recipe" defines a specific combination of process colors which can be used to emulate a spot color. Each recipe has a cost determined with respect to each of the selected image quality attributes, discussed herein further. Spot colors in an N-color marking system (N≥4) are typically rendered with a Gray Component Replacement (GCR), since some colors can be rendered by any of several different recipes.

A "reference ICC profile" is a set of data that characterizes a color input or output device, or a color space, according to standards promulgated by the International Color Consortium (ICC). For the purposes hereof, the reference ICC profile can be used to derive reference reflectance spectral values.

A "reference reflectance spectrum value" is a reflectance value, either estimated or from measurements obtained from an output print of a color marking device. The reflectances have been measured using a reflectance sensing device.

A "reflectance sensing device" is a device capable of measuring an amount of light reflected from a sample. Reflectance sensing devices can be, for example, a full width sensing array, a spectrophotometer, a colorimeter, or a densitometer, as are widely understood in the arts.

A "profile LUT" or "printer profile" is a multidimensional lookup table (LUT) that maps from a colorimetric (LAB or XYZ) space to a device space to profile a color device. Entries within the LUT form a grid, generally on the order of $33^3$ nodes, or smaller. When the input pixels to be corrected correspond to the nodes of the LUT, the corresponding device-specific color values are retrieved directly from the LUT. If the pixels are not on the node then color values are derived via an interpolation technique which maps a device-specific (CMYK) representation to a visual color representation (generally L*a*b* or XYZ). As these tables are used for processing images with millions of pixels, interpolation must be fast. In order to provide a simple and fast interpolation, the nodes of the LUT are arranged in a rectangular grid to make it easy to find a particular sub-cube containing a desired color. Generally, tiling in such a LUT is even and regular. The reader is directed to section 7.8 of the above-incorporated reference: "*Control of Color Imaging Systems: Analysis and Design*" and Chapter 5 of the above-incorporated reference: "*Digital Color Imaging Handbook*", which describe profile LUT generation.

An "image quality attribute" is a mathematical definition for determining a given image quality defect, such as, for instance, visual color match, graininess (micro-uniformity), mottle (macro-uniformity), color stability, metamerism, ink cost, color difference, and spectral match. Example image quality metrics are described in: *International Print Quality Standard*—ISO/IEC 13660:2001 which specifies device-independent image quality metrics, measurement methods, and analytical procedures used to describe a quality of an image output from a document reproduction device. Each of the image quality attributes has an associated cost of applying that attribute to a given device.

"Visual color match" are visually perceptible pseudo-random defects which may arise, for instance, from a non-uniform LED imager, contamination of voltage elements in the charger, and the like.

"Color difference" refers to a device's ability to reproduce colors under various illuminants. Color difference focuses on appearance under specific illuminants and can be expressed using well known color difference equations. These calculations can be performed across a variety of illuminants with one of them acting as a reference.

"Metamerism" is the change in color difference between a pair of samples. Metamerism occurs because each type of cone in the eye responds to the cumulative energy from a broad range of wavelengths so that different combinations of light across all wavelengths can produce an equivalent receptor response and the same tristimulus values or color sensation. The magnitude of metamerism can be measured by a change in ΔE CMC for a sample pair between two illuminants. A metameric pair could have a ΔE CMC=0 in a first light and a high ΔE CMC in a second light. Metameric pairs should match under a reference condition but mismatch under a test condition. The degree of metamerism is a measure of the degree of mismatch under the test condition.

A "Metameric Index" (MI) can be generally defined as the metric to evaluate the degree of metamerism wherein two reflectance spectra differ at only within a single narrow wavelength band. The spectral curves of two closely matching, non-metameric samples are nearly identical. In many cases, the pair of samples achieves a close match under the reference condition. One of ordinary skill will appreciate that parametric correction can be used to adjust the spectral curves before MI calculation.

"Spectral Match" is a measure of how well the measure spectral reflectance of two colors match. Spectral match can quantified using metrics such as, for example, metameric index.

"Mottle" refers to undesirable non-uniformity of color on an output print. Such irregularities may be due, for example, to defective toner transfer from the belt to the image forming surface. ISO-13660:2001 defines mottle as the Standard Deviation (STD) of Optical Density (OD) between 1.27×1.27 mm$^2$ and 12.7×12.7 mm$^2$ over a defined spatial frequency. Xerox defines mottle as the standard deviation of L* (together with an OD correction) between 1.1×1.1 mm$^2$ and 5.5×5.5 mm$^2$.

"Graininess" is the aperiodic fluctuation of density at a spatial frequency in all directions. Other definitions exists such as with different spatial frequency ranges and measuring fluctuations at different color space (e.g., L* rather than density).

"Color stability" or "color variability" or "color consistency" is a measure of output color variation for a given device-dependent color specification over one or more of: time, across different output devices, and/or across different portions of an output image. Each device-dependent color specification has a color stability value for each color of interest. Different color stability values are able to be determined for a particular device-dependent color specification to reflect, for example, within image color stability and within job color stability. Color stability values for a particular device-dependent color specification can be determined for different images that were created at respective times that contain that particular device-dependent color specification and that are separated by various amounts of time and/or various amounts of intervening images having been produced. Color stability is also able to be characterized for an individual printer or for a family or other population of printers. Color instability is attributable to such factors as photoreceptor or charging device variability, variation in temperature or humidity, age of the photoreceptor unit, age of an individual toner color, variability in toner develop-ability on photoconductor, transfer or fusing process variability, or other like environmental and/or mechanical factors. In addition, changes in media weight or mechanical alignment of machine components may result in color-to-color registration errors which can impact color stability.

A "multi-objective cost function", as used herein, is a function wherein multiple objectives are accounted for, including one or more image quality attributes and smoothness of the LUT in the color recipe. Requirements on color accuracy as well as robust color matching under various illuminants are formulated as constraints. The optimization is based on a printer model comprising a mapping function from input N-color recipe to reflectance spectra, L*a*b*, and image quality. For a specific node V in the LUT, the optimization is defined as the weighted summation of all objectives. In one embodiment, the multi-objective cost function J is given by:

$$J = \Sigma_i^n \omega_i f_i(X) + \omega_{n+1} d \quad (1)$$

where $\omega_i$ is the $i^{th}$ weight, X is an N-color recipe of the current node V, $f_i$ is the $i^{th}$ cost of applying X to the $i^{th}$ image quality attribute, and $\omega_{n+1}$ is a weight applied to distance d, where d is determined by:

$$X_r = \Sigma_i \alpha_i X_{i,nbr} \quad (2)$$

$$d = |X - X_r| \quad (3)$$

where $X_{i,nbr}$ is the $i^{th}$ recipe of the neighbor node of the current node V, and $\alpha_i$ is a weight applied to the $i^{th}$ recipe determined in a reverse proportion to a distance the neighbor node is from node V. Here the neighbors are defined as nodes within a certain distance of node V, with the distance calculated in the input color space of the LUT.

Regarding the constraints on color match, we require the color matching error such as, for example, $\Delta E2000$, be bounded by a threshold $e_m$. Additional constraints on the spectral response of the candidate recipes are introduced to ensure visual color match and robustness to illumination variation. A reference profile that is well received by the customer is chosen to produce the reference reflectance spectrum for each node, and the distances of the predicted spectra of the candidate recipes to the reference are limited to be lower than distance $d_m$, as given by:

$$|R(X) - R_{ref}| < d_m. \quad (4)$$

where R(X) is the predicted spectra and $R_{ref}$ is the reference spectra.

For example, if X=CMYK then R(C, M, Y, K) is the reflectance spectra corresponding to the given CMYK levels, and $R_{Ref}$ is the spectra of the recipe produced by the reference ICC profile for the target L*a*b* values ($Lab_{target}$) associated with the node. The norm of the difference is used as a distance metric but it should be fully appreciated that other measures can also be utilized such as, for example, a mean square error. We restrict the search space for the optimization process to the candidate solutions that satisfy the color matching constraint placed on $\Delta E2000$, The construction of the LUT starts from the nodes on the neutral axis and then expands outwards to fill the whole LUT.

Profile LUT Generation

Figure 1:
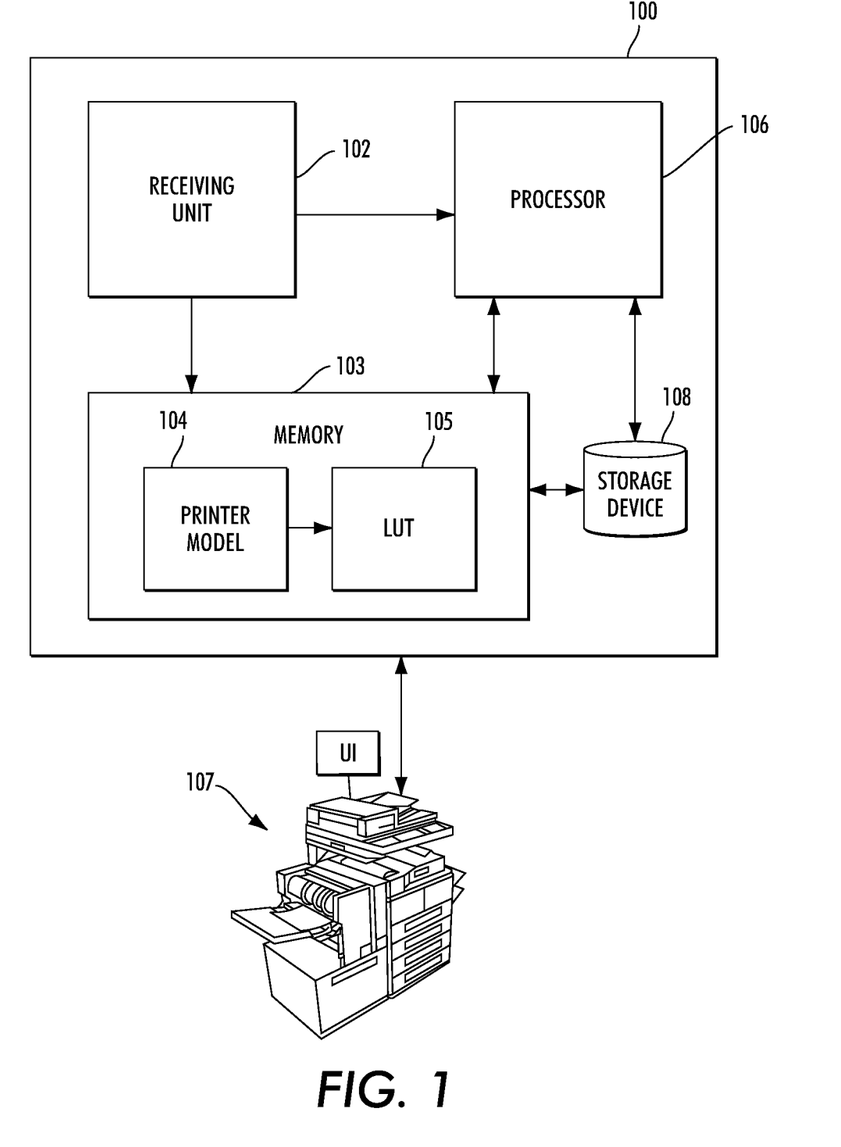
FIG. 1 is a block diagram showing an example system for generating a printer profile LUT.

Reference is now being made to FIG. 1 which illustrates a block diagram showing an example system for generating a printer profile LUT.

In this embodiment, system 100 includes a receiving unit that receives color signals to be printed or output. The example system includes a processor 106 that can be configured to execute a wide array of machine readable program instructions including algorithms for performing multi-objective optimization. The processor also performs some or all of the steps necessary to generate LUT 105 stored in memory 103. Memory 103 receives color signals from receiving unit 102 and stores a printer model 104. The memory is shown in communication with a storage device 108. A lookup table (LUT) 105 is generated which is the optimized printer profile LUT for a given print engine. The embodiment of FIG. 1 is shown interfaced to an example printer device 107 and an example storage device 108. The optimized printer profile LUT 105 is generated using printer model 104 which, in turn, is either stored to storage device 108 or provided to color marking device 107. In other embodiments, the printer profile LUT 105 is optimized by processor 106 using a feedback control loop that includes print device 107. While the system of FIG. 1 is shown as being external to print device 107, it should be appreciated that system 100 can be incorporated, in whole or in part, as a system or sub-system within printer 107.

Flow Diagram of One Embodiment

Figure 2:
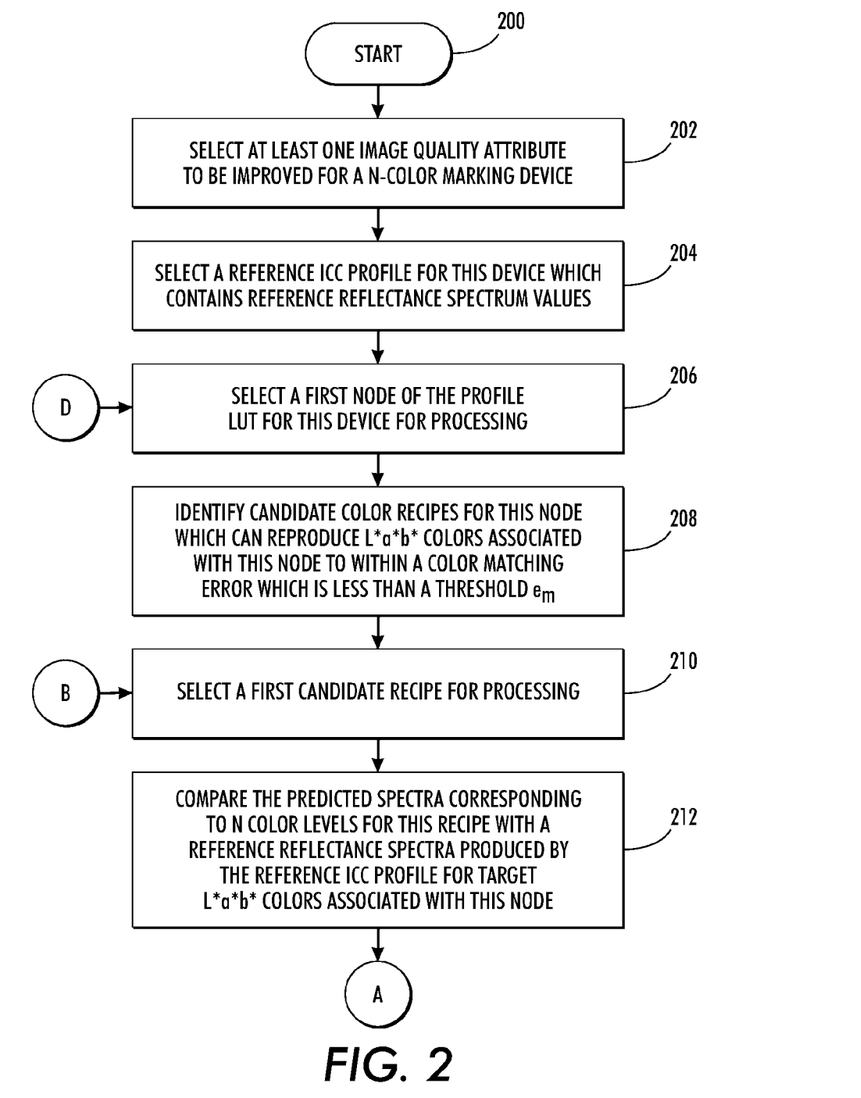
FIG. 2 is a flow diagram of one example embodiment of the present method for profile LUT construction which uses a multi-objective cost function to improve one or more image quality attributes, while ensuring the smoothness of LUT in the device color space and robust color match.

Reference is now being made to the flow diagram of FIG. 2 which illustrates one example embodiment of the present method for constructing a profile LUT for accurate color reproduction in a N-color marking device. Flow processing beings at step 200 and immediately proceeds to step 202.

At step 202, at least one image quality attribute is selected which is desired to be improved for an N-color marking device. Each of the image quality attributes has an associated cost of applying the attribute to the device. The image quality attributes can be selected by a user using, for instance, a graphical user interface of a computer workstation, or these can be retrieved from a memory or received from a remote device over a network.

At step 204, a reference ICC profile is selected. The reference ICC profile can be retrieved from a memory or storage device or received from a remote device over a network.

At step 206, a first node of the LUT is selected or otherwise identified for processing. Preferably, nodes are selected starting from nodes along a neutral axis and extending outward from there.

At step 208, candidate color recipes are identified with this node. These color recipes are those which can reproduce target L*a*b* colors associated with this node to within a color matching error which is less than a predetermined threshold error $e_m$.

At step 210, select a first candidate color recipe for processing.

At step 212, compare a predicted spectra corresponding to N color levels for this particular recipe with a reference reflectance spectra corresponding the recipe produced by the reference ICC profile for target L*a*b* colors associated with this node.

Figure 3:
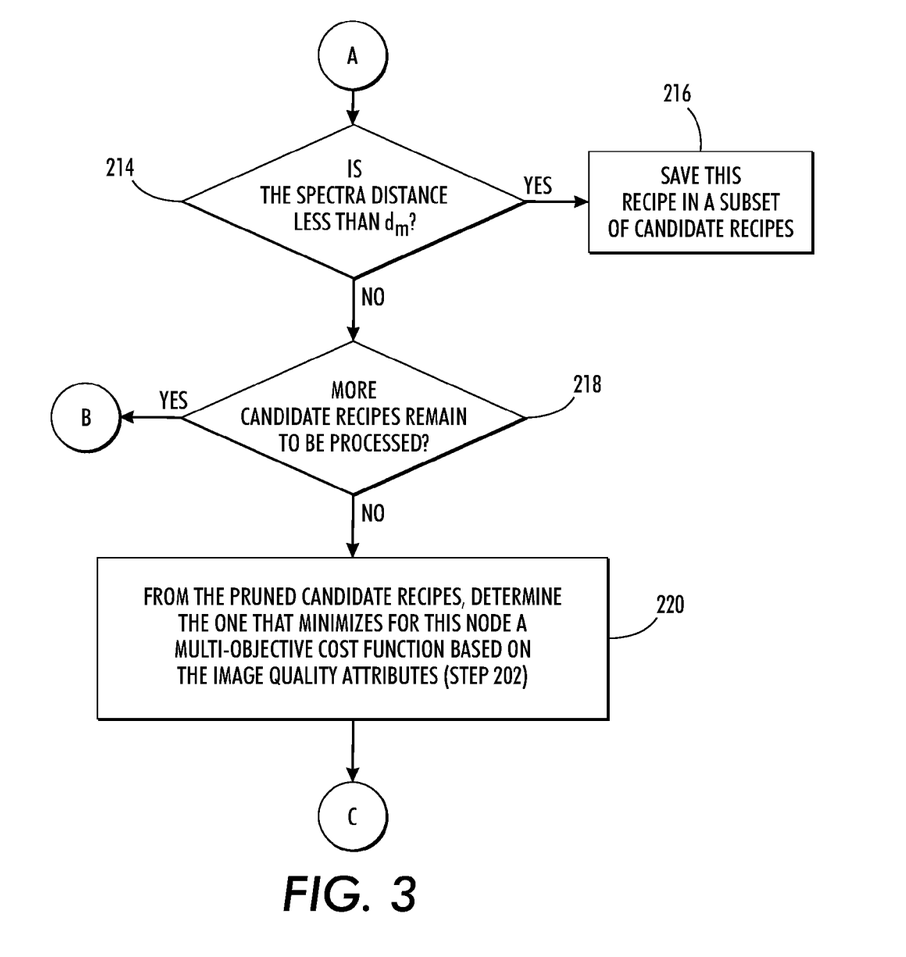
FIG. 3 is a continuation of the flow diagram of FIG. 2 with flow processing continuing with respect to node A.

Reference is now being made to the flow diagram of FIG. 3 which is a continuation of the flow diagram of FIG. 2 with flow processing continuing with respect to node A.

At step 214, a determination is made whether the spectral difference (a result of the comparison of step 212) is less than a threshold distance $d_m$. If yes then, at step 216, this candidate recipe is stored for subsequent processing. The steps of 214 and 216 collectively effectuate a pruning of the candidate color recipes to a subset of recipes which meet the threshold requirements of distance $d_m$.

At step 218, a determination is made whether any more candidate recipes remain to be processed. If so then processing repeats with respect to node B wherein, at step 210, another candidate recipe is selected or otherwise identified for processing. Processing repeats in such a manner until the full set of candidate recipes for the current node (selected in step 206) has been pruned accordingly.

At step 220, from the pruned candidate recipes, determine the recipe that minimizes for this node a multi-objective cost function based on the image quality attributes (step 702). One embodiment of a multi-objective cost function is discussed above with respect to Eq. (1). The multi-objective cost function is effectively driven to a minimum. Once the minimum has been reached, then processing continues with respect to node C of FIG. 4.

Figure 4:
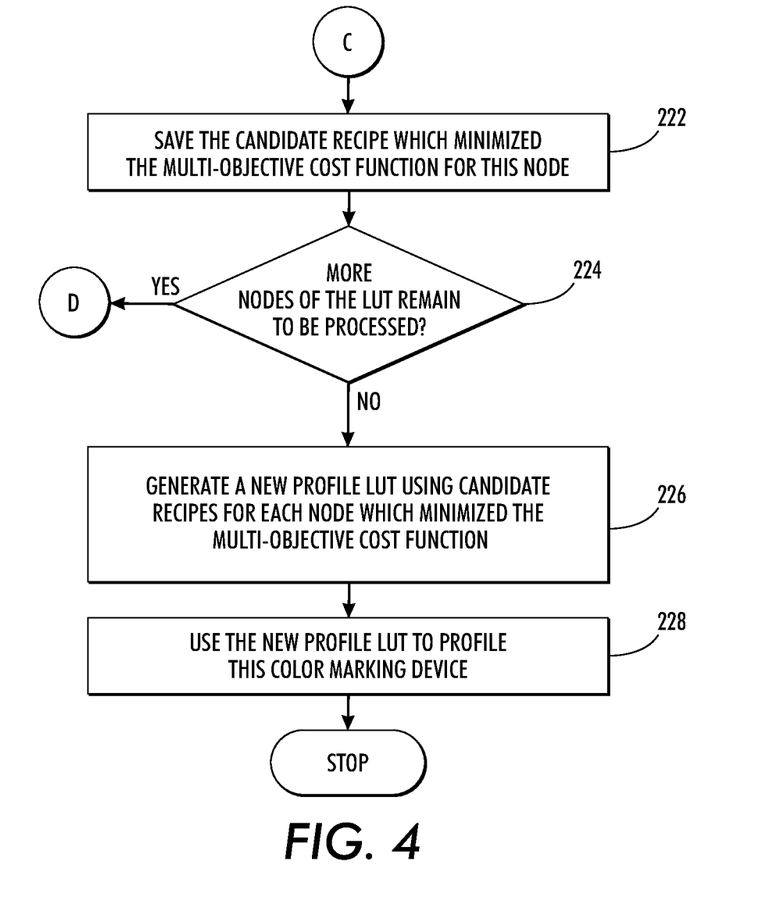
FIG. 4 is a continuation of the flow diagram of FIG. 3 with flow processing continuing with respect to node C.

Reference is now being made to the flow diagram of FIG. 4 which is a continuation of the flow diagram of FIG. 3 with flow processing continuing with respect to node C.

At step 222, identify and save the candidate recipe which minimized the multi-objective cost function for this node.

At step 224, a determination is made whether any more nodes remain to be processed. If so then processing continues with respect to node D wherein, at step 206, another node of the LUT is identified or otherwise selected for processing and processing repeats in a similar manner. For this next node, candidate recipes are identified which can reproduce target L*a*b* colors associated with this node to within a color matching error which is less than a predetermined threshold error $e_m$. This set of candidate color recipes is then pruned to obtain a subset of candidate recipes which are less than the threshold distance $d_m$. A multi-objective cost function is computed for this node with respect to the subset of candidate recipes and the selected image quality attributes and the smoothness of the LUT in the color recipe. The cost function is then driven to a minimum such that a single candidate color recipe can be identified. This recipe is then associated with this node and stored. Once all the nodes of the LUT have been processed then processing continues with respect to step 226.

At step 226, a new profile LUT is generated for this marking device using the identified candidate recipes for each node which minimized that node's respective multi-objective cost function. The new LUT produces colors on the device which have a visual color match and which are robust to illumination variation, while improving the selected image quality attributes for that device.

At step 228, the new LUT is used to profile the color marking device. Thereafter, in this embodiment, further processing stops.

It should be understood that the flow diagrams depicted herein are illustrative. One or more of the operations illustrated in the flow diagrams may be performed in a differing order. Other operations may be added, modified, enhanced, or consolidated. Variations thereof are intended to fall within the scope of the appended claims. All or portions of the flow diagrams may be implemented partially or fully in hardware in conjunction with machine executable instructions in communication with various components of a system.

Performance Results

Figure 5:
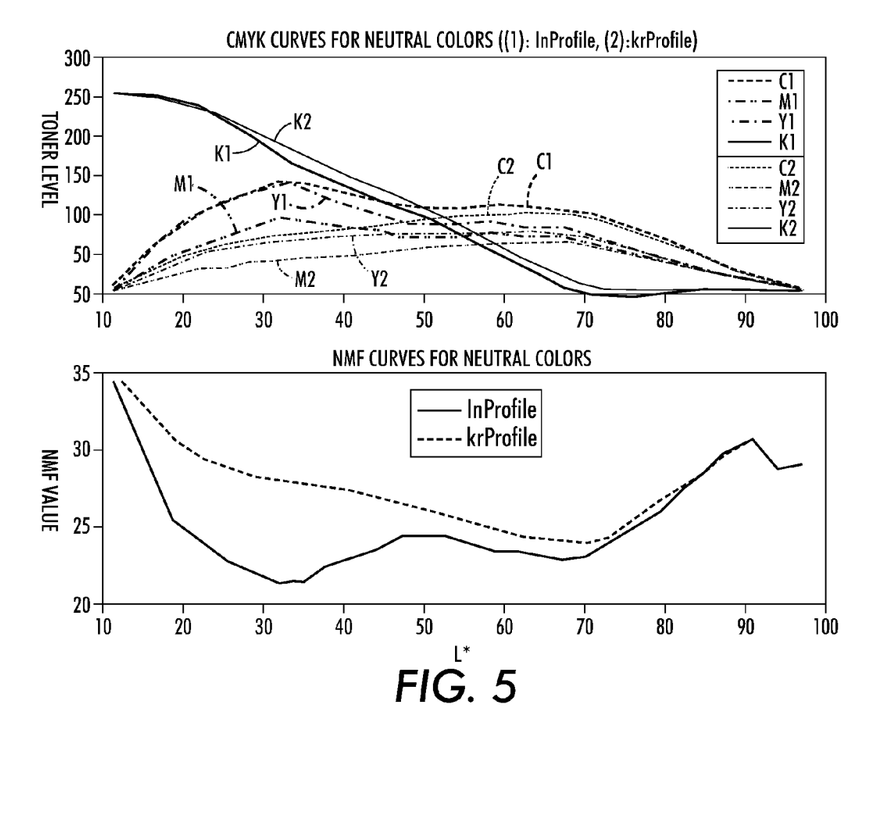
FIG. 5 is a chart which shows a comparison between the behavior of a new low NMF profile (InProfile) and the existing K-restricted iGen profile (krProfile) along the neutral axis.

Simulation results are based on a printer model for the iGen4. FIG. 5 compares the behavior of the new profile LUT (InProfile) generated according to the teachings hereof, and the existing K-restricted iGen profile (krProfile) along the neutral axis. Each of the respective CMYK color lines are labeled such that C1 refers to the plot of InProfile behavior for Cyan while C2 references the plot of the krProfile for Cyan. This same reference scheme is shown for each of C, M, Y, and K. The new profile LUT is slightly less smooth in CMYK but has significantly lower NMF (the selected image quality attribute). According to past experiences, an NMF difference greater than 3 on a solid color print is perceptible to human observers.

The new profile LUT has been tested on iGen4 printer with contour-prone images and has shown satisfactory results.

Example Color Management System

Figure 6:
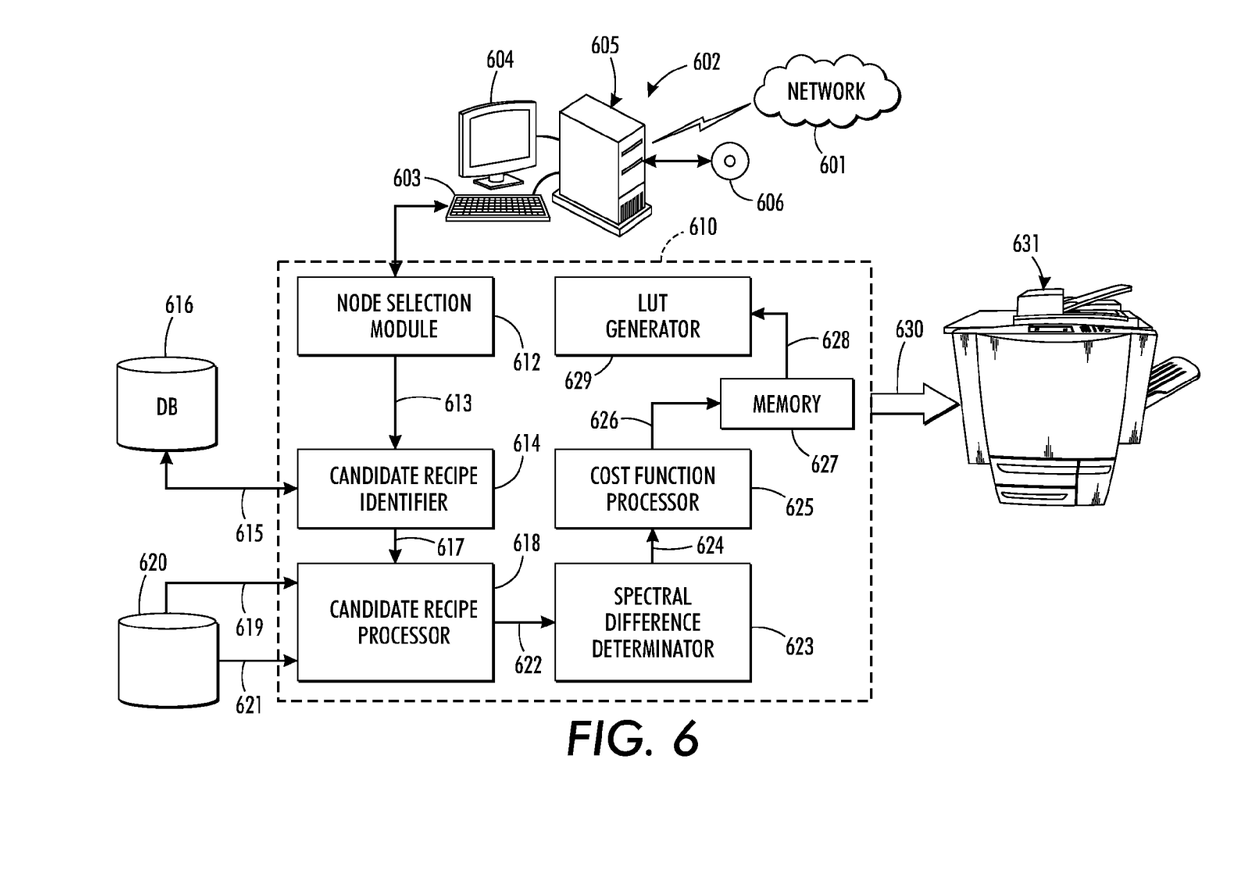
FIG. 6 illustrates a functional block diagram of one example embodiment of a color management system wherein various aspects of the present method are implemented.

Reference is now being made to FIG. 6 which illustrates a functional block diagram of one example embodiment of a color management system wherein various aspects of the present method are implemented.

The system of FIG. 6 is shown generally comprising a workstation 602 which includes a graphical user interface comprising a keyboard 603 and monitor 604, a special purpose computer 610, and a N-color marking device 631. Computer case 605 houses a motherboard, processor, hard drive, CD-ROM drive, and a network card. Rewriteable media 606 stores executable machine readable program instructions and data. Monitor 604 is in communication with a graphics video card contained within computer case 605. Workstation 602 is in communication with one or more remote devices over network 601. A user utilizes the workstation to make a selection of one or more image quality attributes desired to be improved for N-color marking device 631. Each of the image quality attributes has an associated cost of applying that attribute to the device. The image quality attributes can be retrieved from a memory or storage device, or received from a remote device over network 601. The user also uses the workstation to select a reference ICC profile. The reference ICC profile can also be retrieved from a memory or storage device or received from a remote device over network 601. It should be appreciated that workstation 602 has an operating system and other specialized software configured to display numeric values, text, scroll bars, dials, slideable menu bars, pull-down menus, selectable options, buttons, and the like, for entering, selecting, modifying, and accepting any information needed for processing. The embodiment shown is only illustrative and may include any other functionality which any display device known in the arts is capable of displaying. Software to configure a user interface or any portion thereof to display/enter/accept data is generally customizable. Default settings and initialization parameters can be retrieved from storage device 606, as needed. Although shown as a desktop computer, it should be appreciated that the workstation can be a laptop, a mainframe, a client/server, or a special purpose computer such as an ASIC, dedicated processor, or the like.

In FIG. 6, special purpose computer 610 is shown comprising a plurality of modules and processing units. Node Selection Module 612 selects a first node of the LUT for processing. Nodes are selected starting from nodes along the neutral axis and processing of nodes expands outward from there. Candidate Recipe Identifier 614 iteratively receives each node 613 of the LUT for processing and, for each node, identifies candidate color recipes which can reproduce target L*a*b* colors associated with the node to within a color matching error which is less than a predetermined threshold error $e_m$ 616 retrieved from storage device 616. Candidate Recipe Processor 618 receives the candidate color recipes which have a color matching error which is less than a threshold error $e_m$ 616 and proceeds to process the candidate recipes 617 by comparing a predicted spectra 619 which corresponds to N color levels for each respective recipe (retrieved from storage device 620) with a reference reflectance spectra 621 corresponding to the recipe produced by the reference ICC profile for target L*a*b* colors associated with this node. Spectral Difference Determinator 623 receives from Module 618 a result 622 of the comparison and determines whether the spectral difference is less than a threshold distance $d_m$. The threshold difference has been entered by a user using, for example, the graphical user interface of workstation 602. If, as a result of the comparison, that the threshold difference for a particular candidate recipe is less than the threshold distance then this candidate recipe is temporarily stored by Module 623. In effect, Module 623 effectuates a pruning the set of candidate color recipes 617 for the current node 613 to a subset of recipes 624 which meet the threshold requirements of distance $d_m$. Cost Function Processor 625 receives the pruned candidate recipes 624 and determines the recipe that minimizes, for this node, a multi-objective cost function based on the image quality attributes entered by the user. Processor 625 drives the multi-objective cost function to a minimum. Once the minimum has been reached, the candidate recipe 626 for node 613 which effectuated a minimum cost is stored to Memory 627. Modules 612-625 collectively process all nodes (613) of the LUT until no more candidate recipes (617) remain to be processed. Once all the nodes have been processed, LUT Generator 629 retrieves all the candidate recipes 628 which minimized the multi-objective cost function for each node from Memory 627 and generates a LUT 630 which is then used to profile N-color marking device 631. LUT 630 produces colors on device 631 which have a visual color match and which are robust to illumination variation, while improving the selected image quality attributes for that device. One example LUT generation system is shown in FIG. 1.

It should be appreciated that any of the modules or processing units shown and described with respect to FIG. 6 are in communication with computer workstation 602. Some or all of the functionality described with respect to any of the modules of FIG. 6 may be performed, in whole or in part, by workstation 602 or by a software program or plug-in. A module may designate one or more components comprising software and/or hardware. A plurality of modules may collectively perform a single function. A plurality of modules may be executed by either a single special purpose computer system or a plurality of special purpose systems operating in parallel. Connections between modules include both physical and logical connections. Modules may further comprise an operating system, drivers, controllers, and other apparatuses some or all of which may be connected to a network. Generally, various modules include routines, objects, components, etc., that are designed to perform particular tasks. Data structures may be employed to implement abstract data types, as are known in the programming arts, to store variables and data used in computations.

Any of the functionality of the present method may be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. The particular form each of the modules will take is a design choice and will be obvious and predictable to those skilled in the art.

Example Special Purpose Computer

Figure 7:
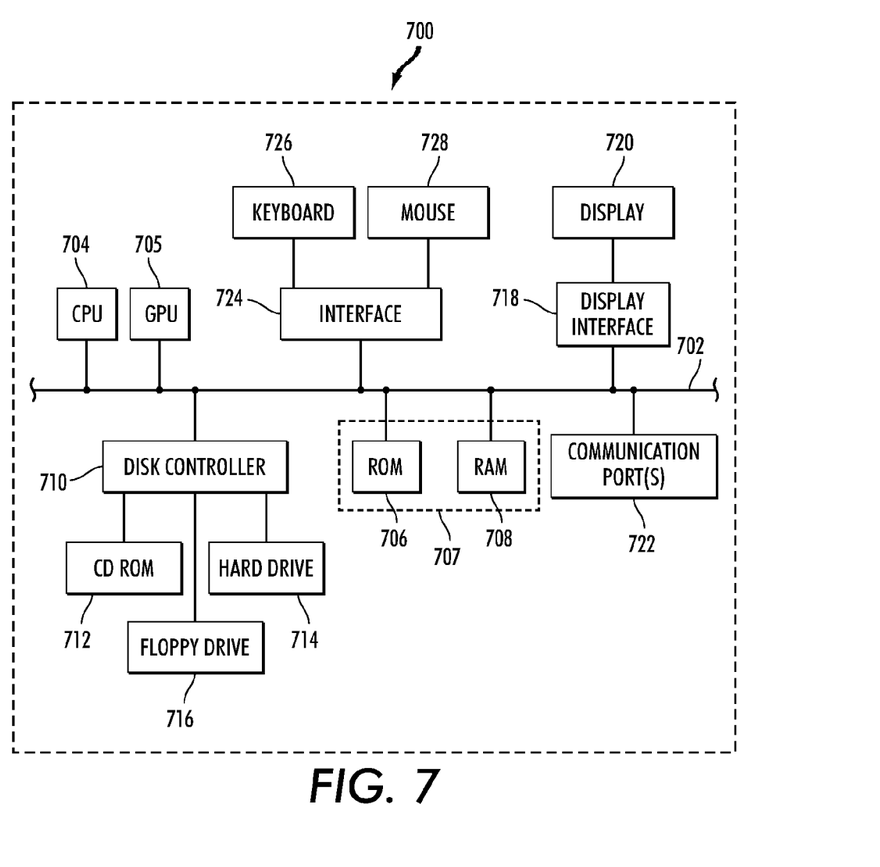
FIG. 7 illustrates a block diagram of one example embodiment of a special purpose computer system for implementing

Reference is now being made to FIG. 7 which illustrates a block diagram of one example embodiment of a special purpose computer system for implementing one or more aspects of the present method as described with respect to the flow diagrams of FIGS. 2-5 and the block diagram of FIG. 6.

Special purpose processor 700 executes machine executable program instructions. Communications bus 702 serves as an information highway interconnecting the other illustrated components. The computer incorporates a central processing unit (CPU) 704 capable of executing machine readable program instructions for performing any of the calculations, comparisons, logical operations, and other program instructions for performing the methods disclosed herein. The CPU is in communication with Read Only Memory (ROM) 706 and Random Access Memory (RAM) 708 which, collectively, constitute storage devices. Such memory may be used to store machine readable program instructions and other program data and results. Controller 710 interfaces with one or more storage devices 714. These storage devices may comprise external memory, zip drives, flash memory, USB drives, memory sticks, or other storage devices with removable media such as CD-ROM drive 712 and floppy drive 716. Such storage devices may be used to implement a database wherein various records of objects are stored for retrieval. Example computer readable media is, for example, a floppy disk, a hard-drive, memory, CD-ROM, DVD, tape, cassette, or other digital or analog media, or the like, capable of having embodied thereon a computer readable program, logical instructions, or other machine readable/executable program instructions or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods herein. Display interface 718 effectuates the display of information on display device 720 in various formats such as, for instance, audio, graphic, text, and the like. Interface 724 effectuates a communication via keyboard 726 and mouse 728. Such a graphical user interface is useful for a user to review displayed information in accordance with various embodiments hereof. Communication with external devices may occur using example communication port(s) 722. Such ports may be placed in communication with the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via communication ports are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

The disclosed methods hereof may be implemented, in part, in software using object or object-oriented software development environments that provide portable source code that can be used on a variety of computer or workstation hardware platforms. Alternatively, the disclosed method may be implemented partially or fully in hardware using logic circuits in conjunction with a spectrophotometric device. Various aspects of the disclosed method may be implemented as software executed on a programmed general purpose computer, a special purpose computer, a micro-processor, or the like. The methods described above can be readily implemented in hardware or software using any known or later developed systems or structures, devices and/or software by those skilled in the applicable art without undue experimentation from the functional description provided herein together with a general knowledge of the computer arts.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The teachings hereof may be partially or fully implemented in software that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a system, an operating system, a plug-in, or may be shipped, sold, leased, or otherwise provided separately either alone or as part of an add-on, update, upgrade, or product suite.

It will be appreciated that various of the above-disclosed and other features and functions, or alternatives hereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for constructing a profile LUT for accurate color reproduction in a color marking device, the method comprising:

selecting at least one image quality attribute desired to be improved for a color marking device, each of said image quality attributes having an associated cost of applying said attribute to said device;

selecting a reference ICC profile to determine reference reflectance spectrum values for each node of a LUT of said color marking device;

for each node of said LUT:

finding candidate recipes which reproduce target L*a*b* colors associated with this node to within a color matching error which is less than a predefined threshold error $e_m$;

pruning said candidate recipes to a subset containing only those recipes where a spectral difference between a predicted spectra corresponding to N color levels for a given recipe for this node and a reference reflectance spectra corresponding to a spectra of a recipe produced by said selected reference ICC profile for target L*a*b* colors associated with this node, is less than a threshold distance $d_m$, each of said candidate recipes having a cost determined with respect to each of said selected image quality attributes; and identifying a candidate recipe from said subset of recipes that minimizes a multi-objective cumulative cost function J that is based upon a cost associated with each recipe in said subset of recipes relative to said selected image quality attributes, said multi-objective cost function comprises:

where $\omega_i$ is the $i^{th}$ weight and $f_i$ is a cost function of applying recipe X to the $i^{th}$ image quality attribute, $\omega_{n+1}$ is a weight applied to a distance in which $X_{i,nbr}$ is a recipe of the $i^{th}$ neighbor node of the current node, and $\alpha_i$ is a weight applied to the $i^{th}$ recipe determined in a reverse proportion to a distance that neighbor node is from node V, calculated in an input color space of said LUT; and generating a new profile LUT for said color marking device, said new profile LUT comprising, for each node, the candidate recipe which minimized that node's respective multi-objective cost function.

2. The method of claim 1, wherein said node of said LUT starts from nodes along a neutral axis and proceeds outward towards the gamut boundary.

3. The method of claim 1, wherein said selected image quality attribute comprises any of: visual color match, graininess, mottle, color stability, metamerism, ink cost, color difference, and spectral match.

4. The method of claim 1, wherein said color recipes comprises using color model, spectra model, and image quality attributes models which relate color recipe values to image color, spectra, and image quality attributes.

5. A system for constructing a profile LUT for accurate color reproduction in a color marking device, the system comprising:

a memory and a storage device; and a processor in communication with said memory and storage device, said processor executing machine readable instructions for performing:

selecting at least one image quality attribute desired to be improved for a color marking device, each of said image quality attributes having an associated cost of applying said attribute to said device;

selecting a reference ICC profile to determine reference reflectance spectrum values for each node of a LUT of said color marking device;

for each node of said LUT:

finding candidate recipes which reproduce target L*a*b* colors associated with this node to within a color matching error which is less than a predefined threshold error $e_m$;

pruning said candidate recipes to a subset containing only those recipes where a spectral difference between a predicted spectra corresponding to N color levels for a given recipe for this node and a reference reflectance spectra corresponding to a spectra of a recipe produced by said selected reference ICC profile for target L*a*b* colors associated with this node, is less than a threshold distance $d_m$, each of said candidate recipes having a cost determined with respect to each of said selected image quality attributes; and identifying a candidate recipe from said subset of recipes that minimizes a multi-objective cumulative cost function J that is based upon a cost associated with each recipe in said subset of recipes relative to said selected image quality attributes, said multi-objective cost function comprises:

where $\omega_i$ is the $i^{th}$ weight and $f_i$ is a cost function of applying recipe X to the $i^{th}$ image quality attribute, $\omega_{n+1}$ is a weight applied to a distance in which $X_{i,nbr}$ is a recipe of the $i^{th}$ neighbor node of the current node, and $\alpha_i$, is a weight applied to the $i^{th}$ recipe determined in a reverse proportion to a distance that neighbor node is from node V, calculated in an input color space of said LUT; and generating a new profile LUT for said color marking device, said new profile LUT comprising, for each node, the candidate recipe which minimized that node's respective multi-objective cost function.

6. The system of claim 5, wherein said node of said LUT starts from nodes along a neutral axis and proceeds outward towards the gamut boundary.

7. The system of claim 5, wherein said selected image quality attribute comprises any of: visual color match, graininess, mottle, color stability, metamerism, ink cost, color difference, and spectral match.

8. The system of claim 5, wherein said color recipes comprises using color model, spectra model, and image quality attributes models which relate color recipe values to image color, spectra, and image quality attributes.

* * * * *